United States Patent [19]

Thunell

[11] 4,278,395
[45] Jul. 14, 1981

[54] METHOD FOR STOCKING WALLBOARD INTO A BUILDING

[75] Inventor: Charles R. Thunell, Oakton, Va.

[73] Assignee: Fairfax Investment Corp., Vienna, Va.

[21] Appl. No.: 969,266

[22] Filed: Dec. 13, 1978

[51] Int. Cl.³ .............................................. E04G 21/14
[52] U.S. Cl. .................................. 414/786; 108/51.1; 187/2; 414/11; 414/353; 414/505; 414/609; 414/659
[58] Field of Search ................... 414/10, 11, 278, 608, 414/416, 659, 786, 347, 353, 505, 609; 187/2; 108/51.1

[56] References Cited

U.S. PATENT DOCUMENTS

| | | | |
|---|---|---|---|
| 2,468,055 | 4/1949 | Gibler | 414/659 X |
| 3,831,712 | 8/1974 | Neely et al. | 187/2 |
| 3,861,546 | 1/1975 | Montgomery | 187/2 X |
| 3,876,099 | 4/1975 | Land | 187/2 X |

Primary Examiner—Robert G. Sheridan

Attorney, Agent, or Firm—Irvin A. Lavine

[57] ABSTRACT

A method of stocking a building under construction with wallboard panels, and apparatus. A stack of horizontal panels is delivered to the building site by truck, and removed by a fork lift truck, and then placed on a pallet provided with transverse rollers. The pallet, loaded with the stack of horizontal panels, is lifted to an upper floor, and a self-propelled transporter vehicle on that floor is placed adjacent the pallet. The stack is transferred as a unit to the transporter, which then delivers the stack to a desired location on the floor of the building, the stack of horizontal panels being discharged as a unit from the transporter.

The pallet has three sets of rollers, longitudinally spaced, so as to provide between each two sets a passage which is upwardly facing, unobstructed, and which will receive one of the tines of a fork lift truck. One of the rollers is powered from a source of energy carried on the pallet. The pallet is provided with lifting eyes on outwardly extending arms at either end of the pallet.

14 Claims, 11 Drawing Figures

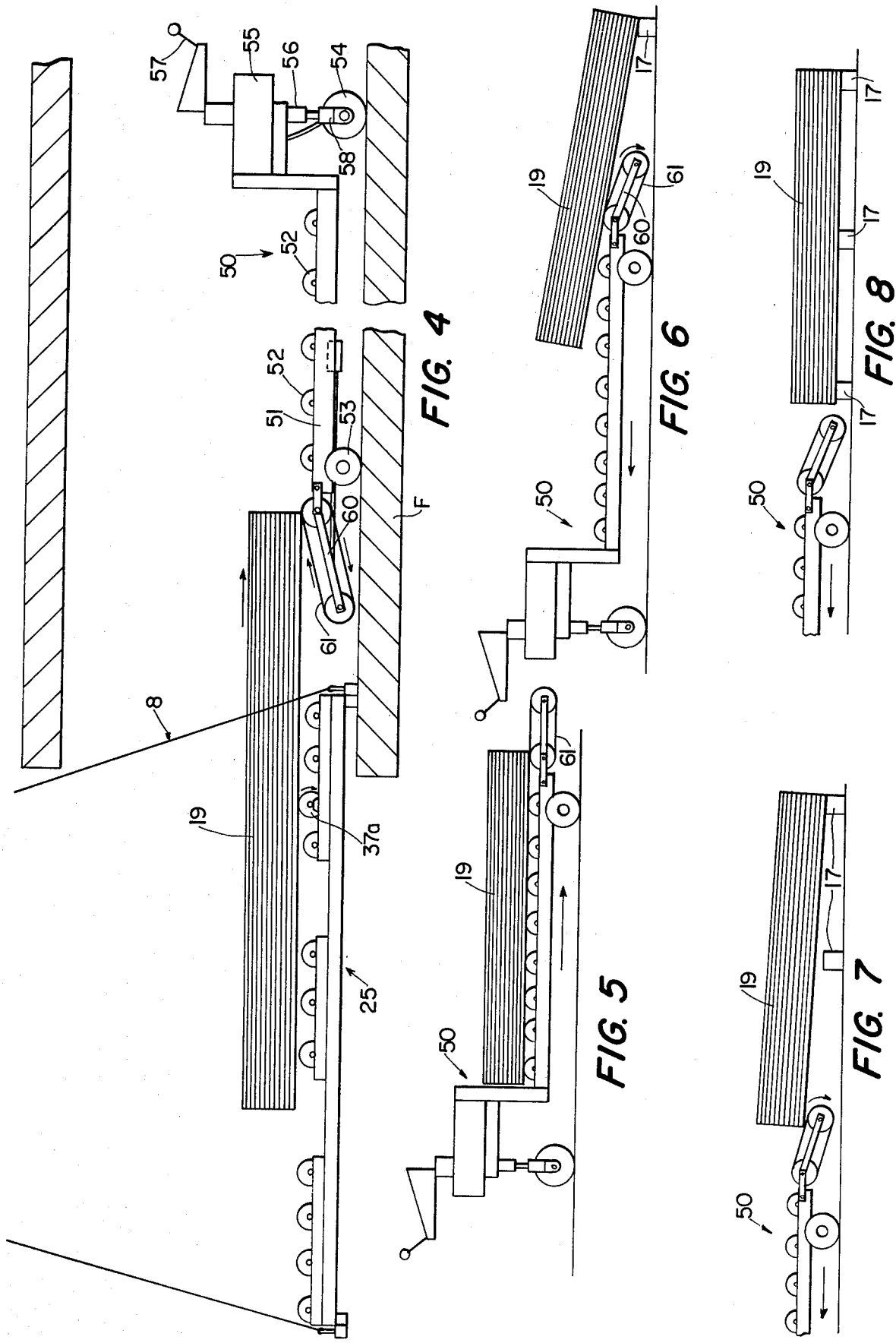

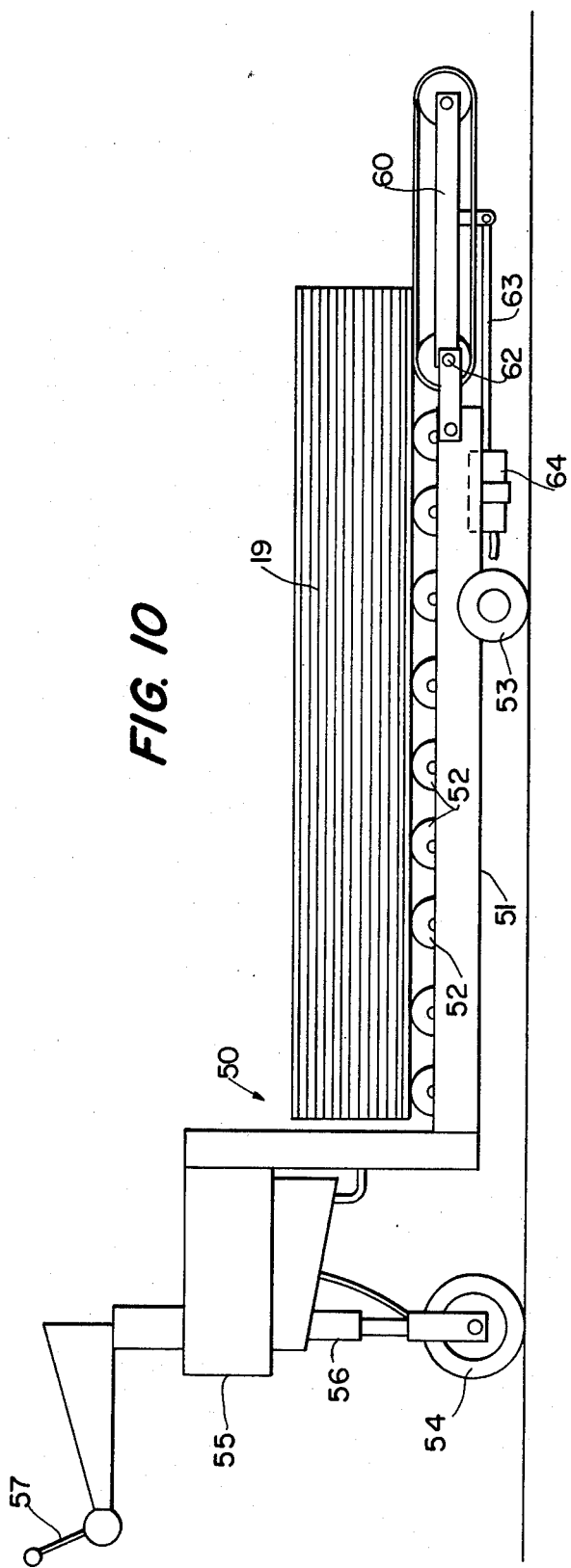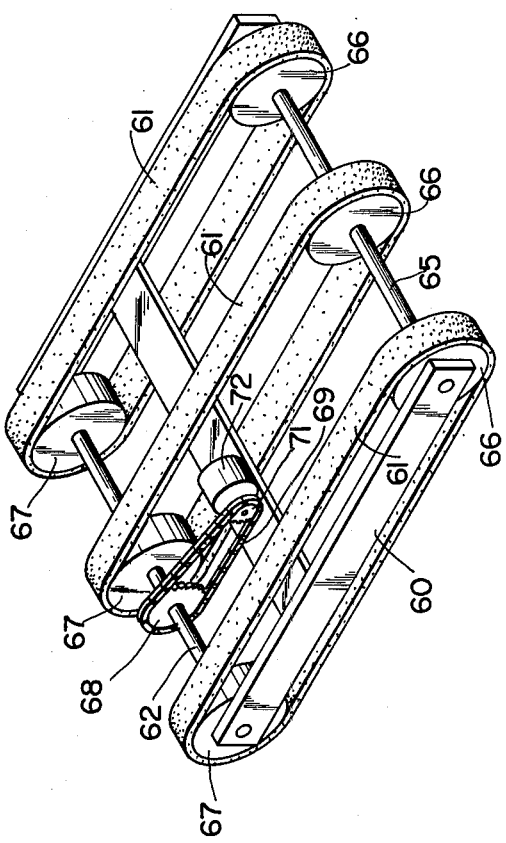

METHOD FOR STOCKING WALLBOARD INTO A BUILDING

BACKGROUND OF THE INVENTION

The present invention relates to material handling method and apparatus, and more particularly to method and apparatus for stocking a builing under construction with wallboard or other panels.

Multi-story buildings are constructed of concrete or other load bearing materials used for the floors thereof, and interior divider walls are made of wallboard. The wallboard is manufactured in sheets or panels, having a uniform width of four feet, and a height of, typically, eight feet, ten feet, or twelve feet. The wallboard is relatively heavy, so that it is the usual practice for two men to lift only two sheets or panels of wallboard at a time. Wallboard installers receive the wallboard sheets, and attach them to studding, and since in a building of any substantial floor area, the amount of interior partition walls, and therefore amount of wallboard utilized, is quite large. The wallboard is manufactured, and shipped in large quantities to a building supply organization, which in turn sells the wallboard to the contractor charged with erecting the building. The wallboard must not only be delivered to the building site, but the building must be stocked with wallboard in sufficient quantities and with sufficient speed to enable the wallboard installers to proceed without delay in their tasks of installing the wallboard, by attaching the wallboard to the studding.

One widely used method of stocking buildings with wallboard is essentially manual, and labor-intensive. A truck loaded with one or more stacks of wallboard is driven to the building site, and is then unloaded, by a crew handling only two panels at a time. The two panels are removed from the truck, and are then put onto a cart. The cart, when loaded, is placed on a hoist, which is a temporary elevator, and then lifted to the desired floor. The cart is then removed from the hoist, and the wallboard is then removed from the cart, two boards or pieces at a time.

Another manual method which has been used is the lifting of a load from the delivery truck by lift forks suspended by a crane. The load is then lifted by the crane to the desired floor, where the lift fork is unloaded, two wallboards at a time. The wallboards are either hand-carried to a desired location on the floor of the building under construction, or are then loaded, two at a time, onto a cart, which is then moved to the desired location, and unloaded two wallboard panels at a time.

Both of the above manual methods require a large amount of labor. For example, a crew of six men at the building site are able to stock a building with only about 750 pieces of wallboard per day. Further, in the method utilizing a crane to support a lift fork, great difficulty, and consumption of time, has been encountered due to the inability to line the tines of the lifting fork with the openings or passages provided underneath the stack of wallboards. This difficulty has impeded the adoption of the method utilizing a crane.

Land, U.S. Pat. No. 3,876,099 discloses Apparatus for Delivery of Material to Floors of a Building Under Construction. This patent discloses a pallet with lift eyes, the pallet being equipped with rollers in order that a large, heavy object may be pushed on and pulled off of the pallet, and the pallet is also provided with guide rails in order that a box having wheels on its bottom may be rolled on and off of the pallet with the wheels engaging the guide rail. In using this apparatus for a large, heavy object, it is placed on the pallet by being rolled thereon; the pallet thus loaded is lifted to the desired floor, and the object is removed from the pallet by being rolled off. Alternatively, the box provided with wheels may be loaded with various materials, the loaded box then pushed onto the pallet, with the wheels engaging the guide rails, the loaded pallet then lifted, and then the box rolled off the pallet. The lift rings of the pallet are positioned so as to block lateral movement of the tines of a fork, so that a load cannot be placed on the pallet by a fork lift truck, thereby effecting a relatively slow loading of the pallet. Further, a transporter vehicle capable of receiving loads from the pallet is not provided, and the pallet itself, while having rollers, does not have any rollers which are powered, for ready and quick discharge of the load from the pallet.

Montgomery, in U.S. Pat. No. 3,861,546, discloses Apparatus for Lifting Wallboard Into Multi-Story Buildings. There are disclosed a generally L-shaped lifting apparatus, having lifting eyes for attachment of a sling. The lifting apparatus also is provided with guide rails, which receive the wheels of a generally L-shaped load carrying device. The carrying device has rollers provided on one surface of an arm of the L-shaped device, the underside of that arm being in the form of a locker; the bottom of the other arm of the L-shaped load carrying device is provided with wheels for engaging tracks on the L-shaped lifting apparatus. The lifting apparatus is also provided with a detachable leg. In use, the lifting apparatus is lowered, and a leg is attached in order to make it rotate about its longitudinal axis, with the load carrying device locked in place on it. Further rotation of the assembly causes the arm of the load carrying device having the rollers to be horizontal, and a fork lift truck is then used to place a stack of wallboard panels on the rollers. The panels are horizontal, and are strapped in position, after which the lifting apparatus with the loaded load carrying device is lifted by a sling, the entire apparatus rotating so that the panels of wallboard are vertical. After being raised to the desired floor, the load carrying device, loaded with wallboard panels in vertical position, is wheeled off of the lifting apparatus, and onto the deck or floor of the building under construction. The loaded load carrying device is then wheeled to a desired location, where it is unloaded by being turned onto its rocker surface of the one arm, after which the load of wallboard is discharged onto the floor or deck. This method and apparatus require careful positioning of the load carrying device onto the lifting apparatus, requires the attachment of a detachable leg to the lifting apparatus, and further requires the rotation of a heavily loaded load carrying device from a position in which the wallboard panels are vertical to a position in which they are horizontal, or beyond. These requirements, therefore, make this apparatus one which is relatively cumbersome to use, and also involves some danger in the handling of the stack of wallboard when it is being discharged from the load carrying device.

Pallets have long been used for supporting and lifting loads. Land U.S. Pat. No. 3,876,099 discloses a pallet having a frame, spaced sets of rollers, and lifting eyes positioned in line with the passages between the sets of rollers. Golrick U.S. Pat. No. 2,509,682 discloses a pallet with a surface made up of spaced apart bars, the passages between the bars being upwardly opening to receive the tines of a fork lift, the sides of these passages being unobstructed for lateral entry or withdrawal of the tines. Shaw U.S. Pat. No. 3,370,727 and Bryan U.S. Pat. No. 4,077,532 disclose that it is old to provide a supporting structure comprising a plurality of rollers and a powered wheel for advancing a box or the like carried by the support rollers. These known disclosures, however, do not provide a pallet suitable for use where a load of wallboard is to be placed thereon by a fork lift, the fork withdrawn in a direction parallel to the ends of the pallet, and then a load delivered from the pallet by a driven roller or the like energized by a self-contained power supply system.

SUMMARY OF THE INVENTION

The present invention relates to a method for stocking a building with panels, such as wallboard, and to associated apparatus. A pallet is provided having spaced groups of rollers, the spacing between the groups defining passages for the reception of tines of a fork lift. The pallet is provided with lift eyes spaced remotely from the passages, and there are provided on the pallet a source of energy and a driving connection from the source of energy to a driven roller. In performing a method, a load of wallboard is delivered to the site of a building under construction by a truck, such as a flat bed truck. The panels or sheets of wallboard are horizontal, and are stacked on the truck. A fork lift truck lifts a stack from the delivery truck, and places the stack on the pallet, the tines entering downwardly into the passages between the groups of rollers, depositing the stack of wallboard on the rollers, and the tines then being withdrawn by backing the fork lift truck away from the loaded pallet. The pallet is then lifted to the desired floor of the building under construction by a sling suspended from a crane; alternatively, the loaded pallet may be raised to the desired floor of the building by a hoist, which is an outside, temporary elevator. Where the loaded pallet is lifted by a crane, an end of the rectangular pallet is placed on the floor or deck of the building, and a self-powered material transporter having a rectangular bed is placed adjacent the pallet so that the longitudinal axis of the pallet and the bed of the material transporter are in line. The power system of the pallet is actuated, so as to drive the pallet roller, and the stack of wallboard is transferred as a unit from the pallet to the transporter. The pallet is then lowered to receive another load or stack of wallboard, while the transporter is driven to a desired location on the floor or deck of the building, and the transporter is then unloaded, the transporter having a source of energy and a powered drive roll to effect its unloading at the desired location. Preferably, the transporter has a pivoted frame at its front end, with powered conveyors, to enable it to readily receive and deposit the stack of wallboard, as a unit.

Among the objects of the present invention are the provision of a method, and related apparatus, for stocking a building under construction with wallboard or the like, utilizing a substantially reduced labor force. Another object is to provide such a method, and related equipment, whereby within a given time, and with a substantially reduced labor force, a quantity of wallboard will be delivered to the upper floor of a building which, under normal practice, require the use of a substantially larger labor force. Still another object of the present invention is the provision of a pallet for use in performing the noted method.

DESCRIPTION OF THE DRAWINGS

FIG. 4 is a view of a pallet discharging the stack of wallboard onto the self-propelled transporter;

FIG. 5 is an elevational view of the transporter shown in FIG. 4, carrying a load of wallboard;

FIG. 6 is an elevational view showing initial stages in the discharge of a load of wallboard from the transporter;

FIG. 7 is a view showing a further stage of unloading of a transporter;

FIG. 8 is a view showing the stack of wallboard unloaded from the transporter;

FIG. 10 is an enlarged, elevational view showing the transporter;

FIG. 11 is a perspective view of a portion of the transporter.

DESCRIPTION OF THE PREFERRED EMBODIMENT

Figure 1:
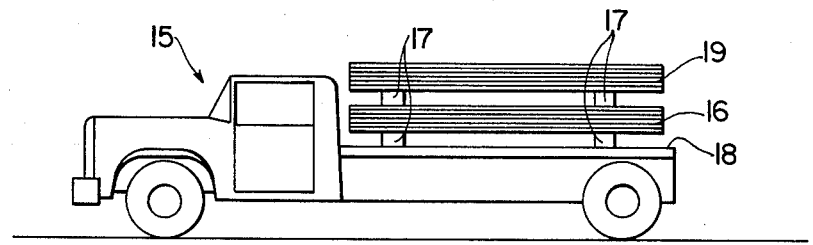
FIG. 1 is an elevational view of a truck carrying wallboard.

Referring now to the drawings, wherein like or corresponding reference numerals are used to designate like or corresponding parts throughout the several views, there is shown in FIG. 1 a conventional flat bed truck 15 carrying a stack 16 of panels, specifically wallboard, supported on dunnage or blocks 17. The dunnage 17 serves to elevate the bottommost sheet or panel of wallboards above the bed 18 of the truck 15, so that the tines of a lifting fork may be inserted thereunder. A second stack 19 of wallboard is carried on the first stack 16, separated therefrom by additional dunnage 17.

Figure 2:
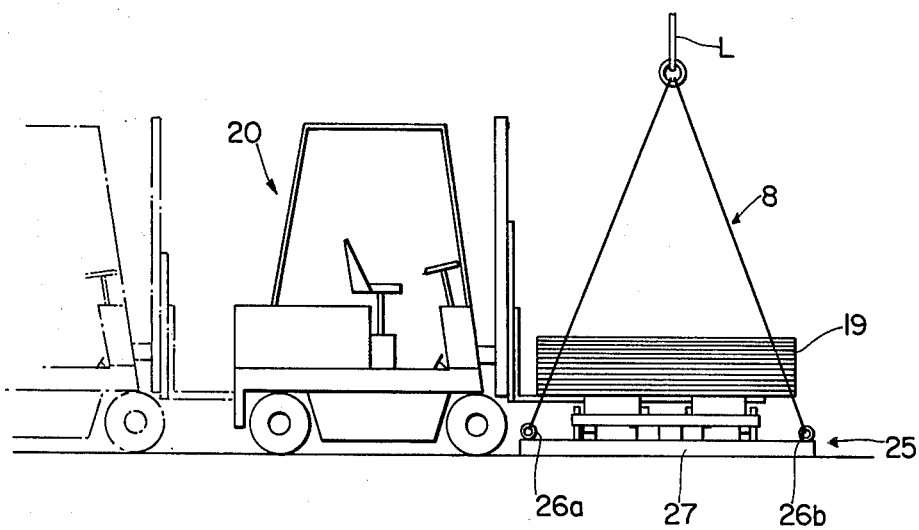
FIG. 2 is an elevational view of a fork lift truck depositing wallboard on a pallet.
Figure 3:
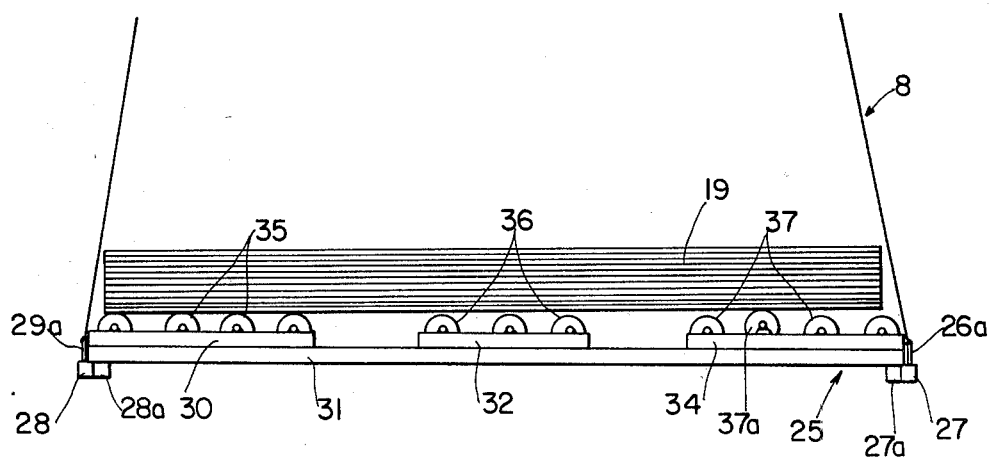
FIG. 3 is an elevational view of a pallet in accordance with the invention, loaded with wallboard.

In FIG. 2, a fork lift truck 20 of known, conventional structure is shown, having lifted the stack 19 of wallboard from the truck 15, and carried it, directly to a pallet 25. The wallboard forming the stack 19 is of conventional size and shape, being rectangular. The pallet 25 is rectangular in plan form, and the longitudinal axis of the stack 19 of wallboard is substantially parallel to the longitudinal axis of the pallet 25: these longitudinal axes are perpendicular to the plane of the paper as shown in FIG. 2, and parallel to the plane of the paper as shown in FIG. 3.

The stack 19 of wallboard is deposited by the fork lift truck 20 onto the pallet 25, the fork of fork lift truck 20 moving downwardly, and depositing the lowermost sheet or panel of wallboard of the stack 19 onto engaging and supporting surfaces of the panel 25, to be hereinafter described. Thereafter, the fork lift truck 20 is in back or moved to the left, to the dotted line position shown in FIG. 2, this movement withdrawing the tines of the fork or fork lift truck 20 from beneath the stack 19, and thereby completely disassociating the fork lift truck 20 from the pallet 25 with its load formed by the stack 19.

In the transferring of the stack 19 from the flat bed truck 15 onto the pallet 25, the sheets or panels forming the stack 19 remain at all times substantially horizontal.

The pallet 25 is provided with lift eyes 26a and 26b, carried by an end frame member 27 of pallet 25; the member 27 extends beyond the lateral boundaries of the main portion of the pallet, so as to provide arms which extend outwardly beyond the sides of the pallet frame. A sling S of conventional construction is provided, having a number of elements, each connected to a lifting eye, and in turn connected to a common point for attachment to a crane line L. A spreader may be used, if desired.

FIG. 3 is a side view showing the pallet 25, having the lower frame member 27 at one end and a corresponding lower frame member 28 at the opposite end, the latter carrying a lifting eye 29a. A side frame member 31 is shown extending longitudinally, connected to transverse end members 28a and 27a, adjacent the lower frame members 28 and 27, respectively. Upstanding supports 32, 33 and 34 carry three spaced groups of antifriction rollers, generally designated 35, 36 and 37. The rollers are parallel to each other, and have their axes transverse to the longitudinal axis of the pallet 25. These rollers 35, 36, and 37 support the stack 19. The groups of rollers 35, 36 and 37 define upwardly and laterally unobstructed passages between them, and these passages receive the tines of the fork lift truck 20 when it deposits the stack 19 onto the pallet, and more particularly to the load supporting rollers 35, 36 and 37. Roller 37a will be seen to extend to a level slightly above that of all of the other rollers 37, and above the level of the rollers 35 and 36.

After the stack 19 has been placed on the pallet 25 as shown in FIG. 2, the loaded pallet is lifted by a sling S, as shown in FIG. 3, and reaches a desired floor of a building under construction. Alternatively, instead of using a sling S and a hoist line L, suspended from a crane, the lifting of the loaded pallet may be effected by a hoist, or elevator, positioned at the edge of the building under construction, and thereby raised to the desired floor or deck of the building.

Referring to FIG. 4, there may be seen a floor F of a building under construction. Typically, this would be a poured, concrete floor, and would be any one of the floors of a building under construction, in which the exterior walls have not yet been put in place, nor, of course, have the interior walls been constructed. FIG. 4 discloses a material transporter 50 positioned on the floor F in position to receive the stack 19 from the pallet 25. The material transporter 50 is self-propelled, and includes a bed 51 provided with rollers 52, bed 51 being supported by front wheels 53 and a rear steering and propelling wheel 54. A housing 55 is provided, which supports a battery, a gasoline engine, a gasoline tank, and a hydraulic pump, the latter being driven by the gasoline engine. The housing 55 also includes a bearing, not shown, to permit rotational movement of a steering column 56 for the wheel 54. Suitable controls, such as the control lever 57, are provided for controlling the engine. A hydraulic motor 58 is carried on a fork in which the wheel 54 is journalled, and serves to supply energy to the wheel 54. The valve (not shown), under the control of a control element 57, controls the flow of hydraulic fluid from the pump to the hydraulic motor 58.

At its forward end, a pivoted frame 60 is provided, which includes a plurality of conveyor belts 61.

As shown in FIG. 4, the roller 37a, which is a powered roller, and which is always in engagement with the bottommost sheet or panel of the stack 19, is energized and this serves to drive or transfer the stack 19, as a unit, from the pallet 25 onto the material transporter 50. The longitudinal axis on the bed 51 of transporter 50 is in substantial alignment with the longitudinal axis of the pallet 25; the frame 60 is slightly depressed from the horizontal, as shown in FIG. 4, and the conveyor belts 61 are energized, being driven by an apparatus disclosed herein below. Thereby, the stack 19 is transferred from the pallet 25, the leading end engaging the conveyor belts 61, and then the entire stack 19, as a unit, being driven by the powered roller 37a and the conveyor belts 61 towards the rear of the material transporter 50. This movement continues until the trailing or rear end of the stack 19 passes the powered roller 37a, after which the transfer force is derived solely from the conveyor belts 61.

The stack 19 is thereby positioned on the self-propelled transporter 50, and then the transporter 50, thus loaded, is driven from the location shown in FIG. 4, as is indicated in FIG. 5. During this time, the pallet 25 is lowered, so as to be again loaded with a stack of wallboard, such as the stack 16 on the flat bed truck 15.

The loaded transporter is then driven to a desired location on the floor of the building, such as a location near a group of wallboard installers working to erect interior walls from the wallboard.

After movement of the transporter 50, as shown in FIG. 5, and the attaining of the desired location, dunnage 17 is placed on the floor, the frame 60 is lowered, and the conveyor belts 61 are driven to thereby unload the stack 19 as a unit, the stack 19 at approximately the bottom of the front end of the stack coming to rest on the dunnage 17, the transporter 50 then being moved away, or to the left, as indicated by the arrow in FIG. 6, so as to maintain the stack 19 in engagement with the dunnage 17, and without movement relative to it. As the material transporter 50 continues to back away, as shown in FIG. 7, additional dunnage 17 is placed in position on the floor, and beneath the stack 19, and finally, as shown in FIG. 8, the stack 19 rests completely on the dunnage 17 on the floor, with the transporter 50 now completely unloaded, and ready to be moved to position as shown in FIG. 4, to receive the next load or stack of wallboard.

The stack 19, as shown in FIG. 5, is in engagement with the conveyor belts 61 at all times during the movement of the transporter 50 after it has received the stack 19, until the stack 19 has been delivered as shown in FIG. 8. Discharge of the stack 19, as indicated in FIGS. 6 and 7, is accomplished by simultaneously energizing the conveyor belts 61, and moving the material transporter 50 rearwardly.

The wallboard sheets or panels will be seen to remain substantially horizontal, from the time they are removed from the flat bed truck 15 to the time when they are unloaded from the material transporter 50. No rotational movement of the stack about a horizontal axis is required, and the stack is at all times handled as a unit, so that individual handling of two sheets or panels of wallboard at a time is avoided. Further, a minimum labor force is required, and the stocking of a building with a given number of sheets or panels of wallboard may be accomplished in a small fraction of the time required for manual stocking, as hereinabove described. The present method achieves an increase in productivity per man of substantial proportion; tests have shown that the present method requires only four men, who are able to stock a building with 4,880 pieces of wallboard per day. With the above described manual method, six men were able to stock only 820 pieces per day.

Figure 9:
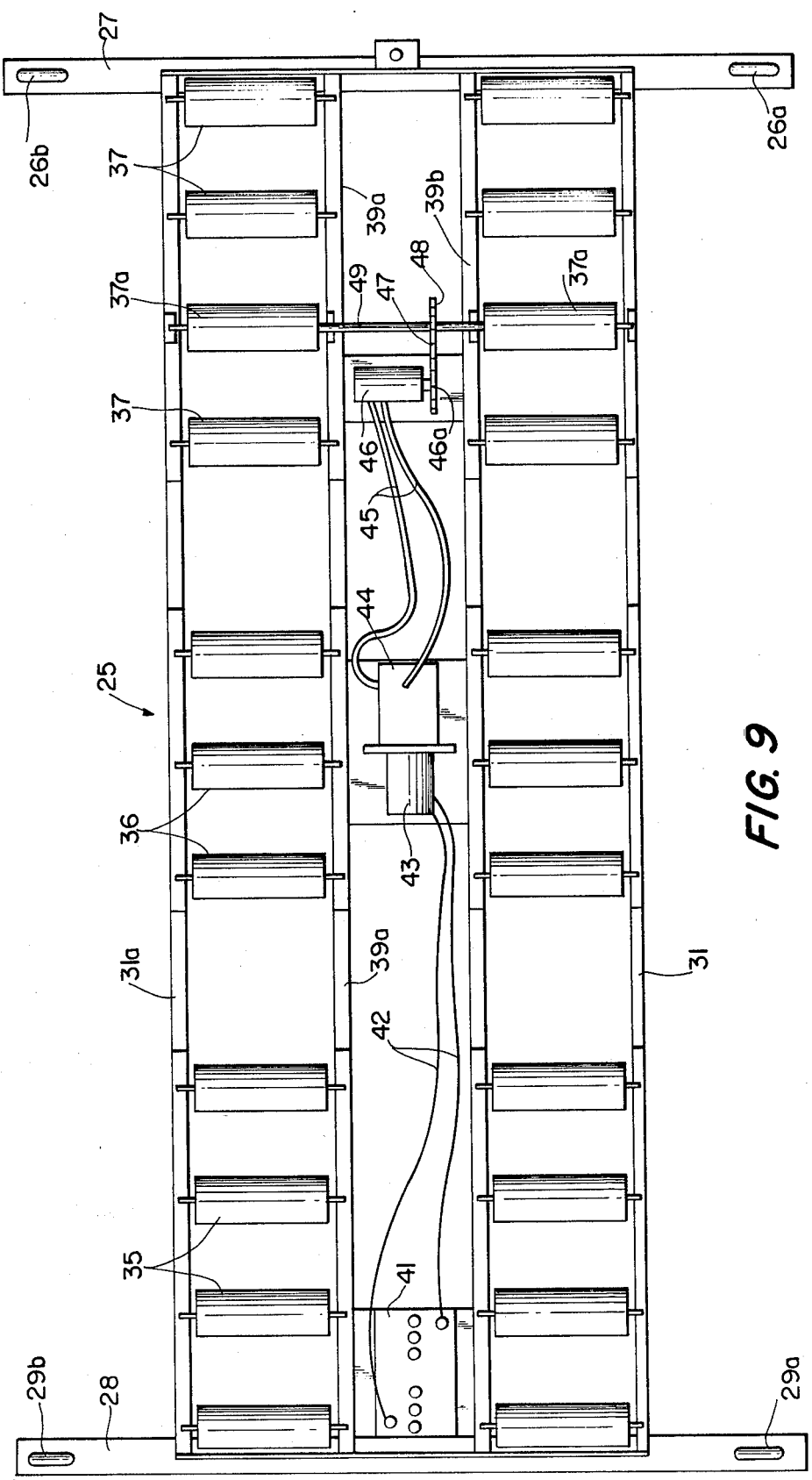
FIG. 9 is a plan view, partly diagrammatic, of the pallets in accordance with the present invention.

Referring now to FIG. 9, there is shown in plan view the pallet 25, including the lower frame members 27 and 28, with the lifting eyes 26a, 26b, 29a and 29b. These will be seen to be placed on the extending arm and formed by the lower frame members 27 and 28 which extend outwardly beyond the sides 31, 31a, forming a portion of the frame of the pallet 25. There may also be seen the load engaging and supporting rollers, being specifically the groups of rollers 35, 36 and 37. As shown, the rollers do not extend all the way across the pallet 25, but in the preferred form illustrated, the rollers are provided in aligned pairs, with a space between them. That space is defined in part by longitudinally extending frame members 39a and 39b.

In FIG. 9, the passages provided for the tines of the fork are clearly shown between the groups of rollers 35 and 36 on the one hand and 36 and 37 on the other hand. The lateral movement of the tines in the passages is not obstructed by an object; specifically, the placement of the lifting rings 26a, 26b and 29a, 29b remote from the passages prevents interference of the tines of the lift fork by the noted lifting rings.

An apparatus for driving the rollers 37a is shown in FIG. 9, and includes an electric battery 41 connected by cables 42 to an electric motor 43. Electric motor 43 is drivably connected to a pump 44, connected by hydraulic lines 45 to a hydraulic motor 46. A chain 47 engages a motor sprocket 46a and a driven sprocket 48 on a shaft 49 to which the rollers 37a are connected. The drive apparatus is controlled by a control means (not shown) suitably located near the right hand end of the pallet 25, and accessible when the pallet is positioned as shown in FIG. 4; a control means may be either a switch in the cables 41 or 42, or a valve in one or both of the lines 45, 46.

Referring now to FIG. 10, the material transporter 50 is shown, the transporter 50 including the pivoted frame 60. Frame 60 is pivoted about a shaft 62 (see also FIG. 11), being moved by a piston rod 63 of a linear hydraulic motor 64. Hydraulic motor 64 is supplied with hydraulic fluid from the pump carried within the housing 55, and is controlled by a suitable valve so as to extend or retract the piston rod 63 in order to rotate frame 60. As shown in FIG. 11, the frame 60 includes a front shaft 65 having pulleys 66 thereon, the aforementioned shaft 62 carrying pulleys 67. Conveyor belts 61 are trained over the pulleys 66 and 67. A sprocket 68 on shaft 62 serves to drive the shaft 62 and hence the conveyor belts 61. Sprocket 68 is driven by a chain 69, trained on a drive sprocket 71, driven by a hydraulic motor 72. Motor 72 is driven by hydraulic fluid from the noted pump within the housing 55, and is controlled by a suitable valve, so that it may be driven in either direction.

As herein disclosed a pallet is capable of being located by a fork, which descends into the passages between the groups of rollers, and is then capable of being withdrawn laterally, through the passages, and without obstruction. Lifting eyes are provided at the ends of the pallet, and positioned so as not to obstruct the passages. The pallet carries a self-contained motor power system for driving a roller, which is at a higher elevation than the other rollers.

The transporter herein disclosed is readily controlled by a single person, is self-propelled, and may assist in loading by energization of the conveyor belt, placed at the desired angle. The load is in engagement with the belts as they pass over the rear, driven pulleys when the load is positioned in its rearmost position on the transporter 50, and that engagement continues until the trailing end of the load passes beyond these driving pulleys, the engagement only being discontinued when the load no longer engages any of the conveyor belts.

It will be obvious to those skilled in the art that various changes may be made without departing from the spirit of the invention, and therefore the invention is not limited to what is shown in the drawings and described in the specification but only as indicated in the appended claims.

I claim:

1. A method of stocking a building under construction with material such as a stack of wallboard comprising:
    (a) lifting a load of said material from a support by the tines of a fork lift truck,
    (b) depositing said load of material onto rollers of a pallet from said fork lift truck,
    (c) elevating said pallet with said load of material thereon to the level of a floor of a multi-story building under construction,
    (d) positioning a material transporter including a material supporting bed, provided with rollers, and support means therefor on the said floor in position directly to receive material from said elevated, loaded pallet,
    (e) transferring said load of material directly from said pallet to said transporter with the load moving on the said rollers,
    (f) transporting said load of material to a desired location on said floor by moving said transporter, and
    (g) unloading said load of material from said transporter.

2. The method of claim 1, wherein said support is a truck.

3. The method of claim 1, wherein said tines are positioned transversely beneath said load prior to lifting said load.

4. The method of claim 1, wherein said load and said pallet are elongate, and said load is deposited on said pallet with its longitudinal axis parallel to the longitudinal axis of said pallet.

5. The method of claim 4, wherein said transporter bed is elongate, and wherein said transporter is positioned in end to end relation to said pallet to receive said material therefrom.

6. The method of claim 1, wherein said loaded pallet after being elevated is positioned with a portion thereof resting on the said floor of the building inwardly of the edge thereof.

7. The method of claim 6, wherein said pallet is elongate, and wherein an end portion of said loaded pallet is positioned on said floor.

8. The method of claim 7, wherein said bed of said transporter is elongate, and said transporter is positioned in end to end relation to said pallet.

9. The method of claim 8, wherein said material is transferred by moving it in its entirety from said pallet to said transporter.

10. A method of stocking a building under construction with material such as flat panels comprising:
    (a) delivering a stack of panels to a site of a building under construction with spacer elements between the bottom of the stack and a support on which the stack rests, (b) lifting the stack as a unit from the support by a lifting device having a fork with spaced tines, (c) depositing the stack as a unit onto rollers of a pallet having rollers which are spaced for reception of the tines of the fork, (d) raising the pallet with the stack thereon to a floor of the building under construction, (e) discharging the stack as a unit from the pallet directly onto a transporter vehicle having rollers to receive said stack, (f) removing the transporter vehicle to a desired location on the floor of the building, and (g) depositing the stack as a unit from said transporter vehicle.

11. The method of claim 10, wherein said panels when delivered are substantially horizontal, and remain substantially horizontal until after the depositing thereof from said transporter vehicle.

12. The method of claim 10, wherein the lifting of the stack as a unit from the support is by a fork lift truck, and further comprising moving said fork lift truck from said support to said pallet and depositing said stack as a unit on said pallet without depositing said stack on an intermediate suppport.

13. The method of claim 10, wherein said discharging of said stack from the pallet is by energizing a conveyor element engaging the bottom of said stack.

14. The method of claim 10, wherein said depositing of said stack from said transporter vehicle is by energizing a conveyor element engaging the bottom of said stack.

* * * * *